United States Patent [19]
Reilly

[11] Patent Number: 5,779,587
[45] Date of Patent: Jul. 14, 1998

[54] JAM TOLERANT ROTARY ACTUATOR WITH SHEAR PINS AND DISENGAGEMENT COUPLING

[75] Inventor: William Reilly, Verona, N.J.

[73] Assignee: Curtiss Wright Flight Systems, Inc., Fairfield, N.J.

[21] Appl. No.: 705,955

[22] Filed: Aug. 30, 1996

[51] Int. Cl.⁶ ............... F16H 3/74; F16H 3/44; F16D 9/00
[52] U.S. Cl. ............ 475/263; 475/298; 475/338; 475/341; 192/150; 464/33
[58] Field of Search .................. 475/219, 263, 475/298, 299, 338, 341, 346; 192/150; 464/30, 33

[56] References Cited

U.S. PATENT DOCUMENTS

| | | | |
|---|---|---|---|
| 1,815,345 | 1/1931 | Colman | 192/150 |
| 2,070,456 | 2/1937 | Spinney | 475/265 |
| 2,427,168 | 9/1947 | Thompson et al. | 475/317 |
| 2,690,685 | 10/1954 | Donandt | 475/335 |
| 2,702,486 | 2/1955 | Crowley | 74/417 |
| 3,499,511 | 3/1970 | Bouhot | 192/56.1 |
| 3,898,817 | 8/1975 | Capewell et al. | 192/7 |
| 3,968,705 | 7/1976 | Amano et al. | 74/424.8 R |
| 4,114,477 | 9/1978 | Iverson | 475/116 |
| 4,189,960 | 2/1980 | Holdeman | 475/298 |
| 4,282,776 | 8/1981 | Eller | 475/149 |
| 4,365,962 | 12/1982 | Regelsberger | 464/39 |
| 4,601,218 | 7/1986 | Bohle | 475/125 |
| 4,856,379 | 8/1989 | Jafarey | 464/32 |
| 4,932,613 | 6/1990 | Tiedeman et al. | 244/213 |
| 5,071,397 | 12/1991 | Grimm | 475/263 |
| 5,120,285 | 6/1992 | Grimm | 475/342 |

*Primary Examiner*—Khoi Q. Ta
*Attorney, Agent, or Firm*—Klauber & Jackson

[57] ABSTRACT

A jam-tolerant geared rotary actuator, capable of performing in a normal operating mode and a jam-tolerant operating mode, which includes: an output spline member for releasably connecting the movable ring gear to the output ring; a decoupling member which includes an input shaft disposed within a hollow timing shaft, and a shear member for sensing excessive torque and initiating the jam-tolerant mode; a sun gear spline member for connecting the sun gear to the hollow timing shaft; an axial displacement member for engaging the output spline member with the movable ring gear and the output ring; and an input engagement member for releasably connecting the axial displacement member to the input shaft. The axial displacement member includes a decoupling bushing and a double threaded decoupling nut. The nut is disposed between the timing shaft and the decoupling bushing. In the jam-tolerant mode, the decoupling bushing and the output spline member are axially displaced, thereby disengaging the output spline member from the output ring gear, and thereby disengaging the output ring from the movable ring gear. The axial displacement member disconnects from the input shaft as well.

24 Claims, 10 Drawing Sheets

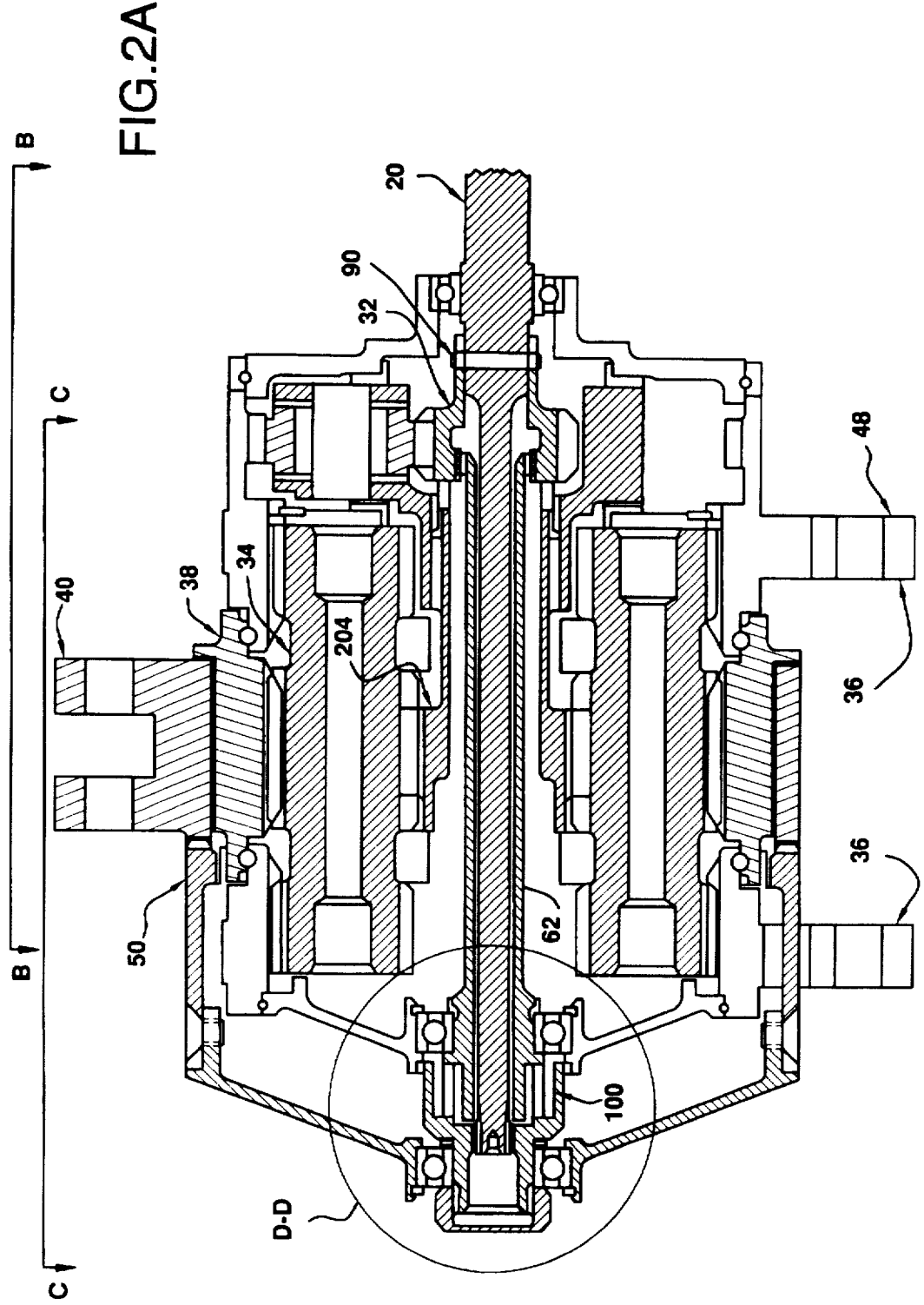

JAM TOLERANT ROTARY ACTUATOR WITH SHEAR PINS AND DISENGAGEMENT COUPLING

BACKGROUND OF THE INVENTION

1. Field of the Invention

The present invention relates to actuators and, more particularly, but not by way of limitation, to a jam-tolerant rotary actuator for use in aircraft flight control systems and the like.

2. Description of the Related Art

Actuators are widely used in many industries to effect and control the movement of various components. In the aerospace industry, actuators are commonly used to control the movement of wing flaps. One particular type of actuator that has been used to control wing flap movement is a rotary actuator. The Curtiss-Wright Power Hinge® (as substantially disclosed in U.S. Pat. No. 4,932,613), is one such actuator which has an exemplary performance record that is based on numerous applications since its initial use on the B-70 Valkyrie Wingtip Fold. Rotary actuators such as the Power Hinge are rugged, compact, and service-proven. The symmetrical internal gearing arrangements allow an equalization of stresses and reduced loads on the gear teeth, resulting in improved capacity and actuator life.

Referring to FIG. 1, a first actuator embodiment utilizing the concepts of the Curtiss-Wright Power Hinge® is shown comprising a single slice actuator. Some of the basic components of this first actuator embodiment include a splined input drive shaft, an input sun gear, a plurality of spindle gears, two support rings for positioning and supporting the spindle gears, a first fixed ring gear with an integral attachment lug, a second fixed ring gear with an integral attachment lug, two annular ball bearings, and a movable output ring gear with integral attachment lugs. The sun gear meshes with the spindle gears. The external gear teeth of the spindle gears mesh with the internal gear teeth of the fixed ring gears and the moveable output ring gear. The gear teeth are held in the proper mesh position by the support rings. Using a full complement of spindle gears in the actuator results in distributing load over many more gear teeth, thereby reducing the load at each tooth contact and increasing actuator capacity life. In addition, because tooth loads on the outside gear teeth of the spindle gears are identical, no overturning moments are created on the spindle gears.

In a typical wing flap movement control application, the fixed ring gears are attached to the aircraft structure by the corresponding integrated attachment lugs, and the moveable output ring gear is attached to the aircraft flap by its corresponding integrated attachment lugs.

FIG. 1 illustrates a single "slice" of a Power Hinge Configuration. It should be understood that more than one slice may be mated to one another in series so that each slice can be driven by a single input shaft. Thus, an actuator (or actuator system) may consist of several slices having a like number of moveable output ring gears, wherein each output ring is connected to the object that is to be moved, such as a wing flap. However, in the event of a jam in a single slice, the movement of the entire array of slices would also be suspended. Furthermore, continued application of torque through the input shaft may result in further damage to the actuator system.

One feature which would significantly increase the functionality of the Power Hinge is commonly known as jam tolerance. The concept of jam tolerance encompasses the ability of an actuator, or an actuator system, to permit continued input shaft drive capabilities despite the occurrence of a jam in the actuator which resulted from gear teeth breakage or other internal actuator failures. In the context of the aerospace industry, such a jam-tolerant feature would permit continued aircraft control flap movement in the event of a jam in one or more of the actuators in an actuator system. Several patents have been directed toward the concept of jam-tolerant actuator designs.

In U.S. Pat. No. 4,856,379 to Jafarey, a non-jamming rotary actuator for aircraft control surfaces is disclosed based upon an orbiting compound planetary drive, which includes an input shaft upon which is attached an integral inner cam member having a first offset and an outer cam member having a second offset, and a key or shear member connecting the inner cam member to the outer cam member. A cylindrically shaped needle bearing fits over the outer cam member and a compound gear is thereafter positioned over the bearing. The teeth of the compound gear mesh with the teeth of a pair of fixed ring gears and with a moving ring gear (output gear), however, the gear teeth of the compound gear are engaged with the internal gear surfaces of the ring gear on the top portion thereof. The gear teeth then lose contact with the internal gear surfaces as one travels down around the gear teeth of the compound gear, until the contact is broken due to the offset of the two cams. Thus, during normal operation, the individual gear teeth of the compound planetary gear rotate into and out of contact with the gear teeth of the internal gear surface of each of the fixed and moving ring gears. In the event of a jam, the shear member shears, which in turn separates the second cam member from the first cam member/input shaft. The input shaft continues to rotate 180°, whereupon the offset between the first and second cam members is canceled, and all the gear teeth of the compound gear are withdrawn from the internal gear surfaces of the ring gears, thereby allowing the input shaft to continue to rotate while the moving ring gear is free to rotate in concert with the output load.

In U.S. Pat. No. 5,071,397 to Grimm, a jam-tolerant geared rotary actuator is disclosed wherein ball members are disposed between a center annular ramp member which is fixed to a through-shaft and two outer ramp members which are splined to the through-shaft. The interrelationship between the ball members and the ramp members is such that when the through-shaft experiences an excessive torque, the two outer ramp members are axially displaced against a bias of springs. The springs are coupled to support ring members which are integrally formed with sun gears. The support ring members and the sun gears are therefore displaced axially outward, which in turn axially displace annular planetary ring support members. Pins, which normally provide axial support for the annular ring support members, become tipped or tilted out of their normal position by the relative rotation between the ramp members. The sun gears are forced to move into notches of recesses which are fashioned between the gearing of the planet gears. As a result, the sun gears become disengaged from the gearing of the planet gears, and the input shaft becomes free to turn.

In U.S. Pat. No. 5,120,125 to Grimm, a jam-tolerant geared rotary actuator is disclosed comprising a compound input stage and a compound output stage doubly connected by input/output link members. The doubly connected arrangement is such that a first input is connected to a first output and also connected to a second input which is, in turn, connected to a second output so that there is an open flow path for torque and power between the input stage and the output stage. Thus, if one flow path locks up, there is always an alternative flow path so that the geared rotary actuator provides for a double flow path.

Accordingly, it is a principal object of the present invention to provide a device for making a rotary actuator jam tolerant.

It is another object of the invention to provide such device for making a rotary actuator jam tolerant which does not increase system weight significantly above that of a conventional rotary actuator system.

It is an additional object of the invention to provide a jam tolerant rotary actuator which does not utilize a shear element in the output load path.

It is a further object of the invention to provide a jam tolerant actuator having an enhanced predictability of the load required to release the actuator from applying torque to its output.

It is yet another object of the invention to provide a device for making a rotary actuator jam tolerant which has a minimal effect on the stiffness of the actuator.

It is a further object of the invention to provide such device which is rugged and durable.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing a jam-tolerant geared rotary actuator capable of performing in a normal operating mode and a jam-tolerant operating mode. The rotary actuator includes: an input shaft; a rotary gear means having a sun gear means with a shear portion, a planet gear means, a fixed ring gear means, a movable ring gear means, and an output ring means; an output spline means for releasably connecting the movable ring gear means to the output ring means; a decoupling means which includes a hollow timing shaft disposed around the input shaft, and a shear means; a sun gear spline means for connecting the sun gear means to the hollow timing shaft; an axial displacement means for engaging the output spline means with the movable ring gear means and the output ring means in the normal mode, and for disengaging the output spline means from the output ring means in the jam-tolerant mode; and an input engagement means for releasably connecting the axial displacement means to the distal end of the input shaft in the normal operating mode, and for disengaging the axial displacement means from the distal end of the input shaft in the jamtolerant mode. The shear means may comprise a shear pin, although other embodiments may include a shear spline or a reduced wall thickness.

In the normal operating mode, the input shaft and the hollow timing shaft rotate together. The shear means "senses" excessive torque in the actuator which is due to internal or external causes, thereby shearing the link between the input shaft, the sun gear means and the hollow timing shaft, such that the input shaft and hollow timing shaft no longer rotate together in the jam-tolerant mode.

The timing shaft of the decoupling means further comprises an external shoulder portion and a lip portion having an external left hand thread. The axial displacement means further comprises a decoupling bushing having a lip portion having an internal right-hand thread, an internal shoulder portion, and a central bore. The input engagement means further comprises at least one axial spline disposed upon the outer diameter of the distal end of the input shaft, and at least one axial spline groove, corresponding to the at least one axial spline on the input shaft, and disposed on the central bore of the decoupling bushing.

The axial spline engages the axial spline groove in the normal operating mode, thereby enabling the input shaft to releasably connect to the decoupling bushing. The axial spline disengages from the axial spline groove in the jamtolerant mode.

The axial displacement means further comprises a double threaded decoupling nut having, for example, an internal left-hand thread and an external right-hand thread, or viceversa. The external right-hand thread of the nut releasably engages the internal right-hand thread of the lip portion of the decoupling bushing, and the internal left-hand thread of the nut releasably engages the external left-hand thread of the lip portion of the decoupling means. The nut abuts the internal shoulder portion of the decoupling bushing in the normal operating mode, and the nut abuts the external shoulder portion of the timing shaft in the normal operating mode.

A rotation in a first direction of the input shaft relative to the timing shaft causes the nut to abut the internal shoulder portion of the decoupling bushing, and causes the nut to travel toward the distal end of the input shaft along the internal left hand thread of the nut and the external left hand thread of the lip portion of the timing shaft, thereby axially displacing the bushing and the output spline means. The displacement causes the output ring to disengage from the movable ring gear means.

Similarly, a rotation in a second direction opposite to the first direction of the input shaft relative to the timing shaft, causes the nut to abut the external shoulder portion of the timing shaft, and causes the decoupling bushing to travel toward the distal end of the input shaft along the external right hand thread of the nut and the internal right hand thread of the lip portion of the decoupling bushing, thereby axially displacing the bushing and the output spline means, whereby the output ring disengages from the movable ring gear means.

Similar disengagement of the output ring may be accomplished with respective mating threaded portions of the decoupling nut, the internal lip portion of the decoupling bushing, and the external lip portion of the decoupling means having opposite handedness to that described above. For example, a decoupling nut with an internal right hand thread and an external left-hand thread may be used in conjunction with respective mating threads.

The output ring means preferably includes a plurality of output spline teeth circumferentially disposed around and extending axially outward from an edge of the output ring and toward the output spline means. The output spline means further includes a face spline member having a plurality of circumferentially spaced mating axial spline teeth compatible with the plurality of output spline teeth of the output ring means. The teeth of the output ring means and the output spline means thus engage in the normal operating mode and disengage in the jam-tolerant mode.

The output spline means also comprises at least one axial output spline disposed upon an inner diameter of the face spline member, and the movable ring gear means also includes at least one axial output spline groove, corresponding to the at least one axial output spline on the face spline member. The axial output spline slidingly engages the axial output spline groove, whereby the spline fully engages the groove in the normal operating mode, thereby connecting the face spline member to the movable ring gear means in the normal operating mode.

The actuator further comprises a disengagement spring means disposed between the output spline means and the movable ring gear means. The spring means substantially prevents the output spline means from re-engaging the output ring in the jam-tolerant mode.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 2A is a cross-sectional view of a first embodiment of a jam-tolerant geared rotary actuator according to the present invention.

DETAILED DESCRIPTION OF THE PREFERRED EMBODIMENTS

Figure 1:
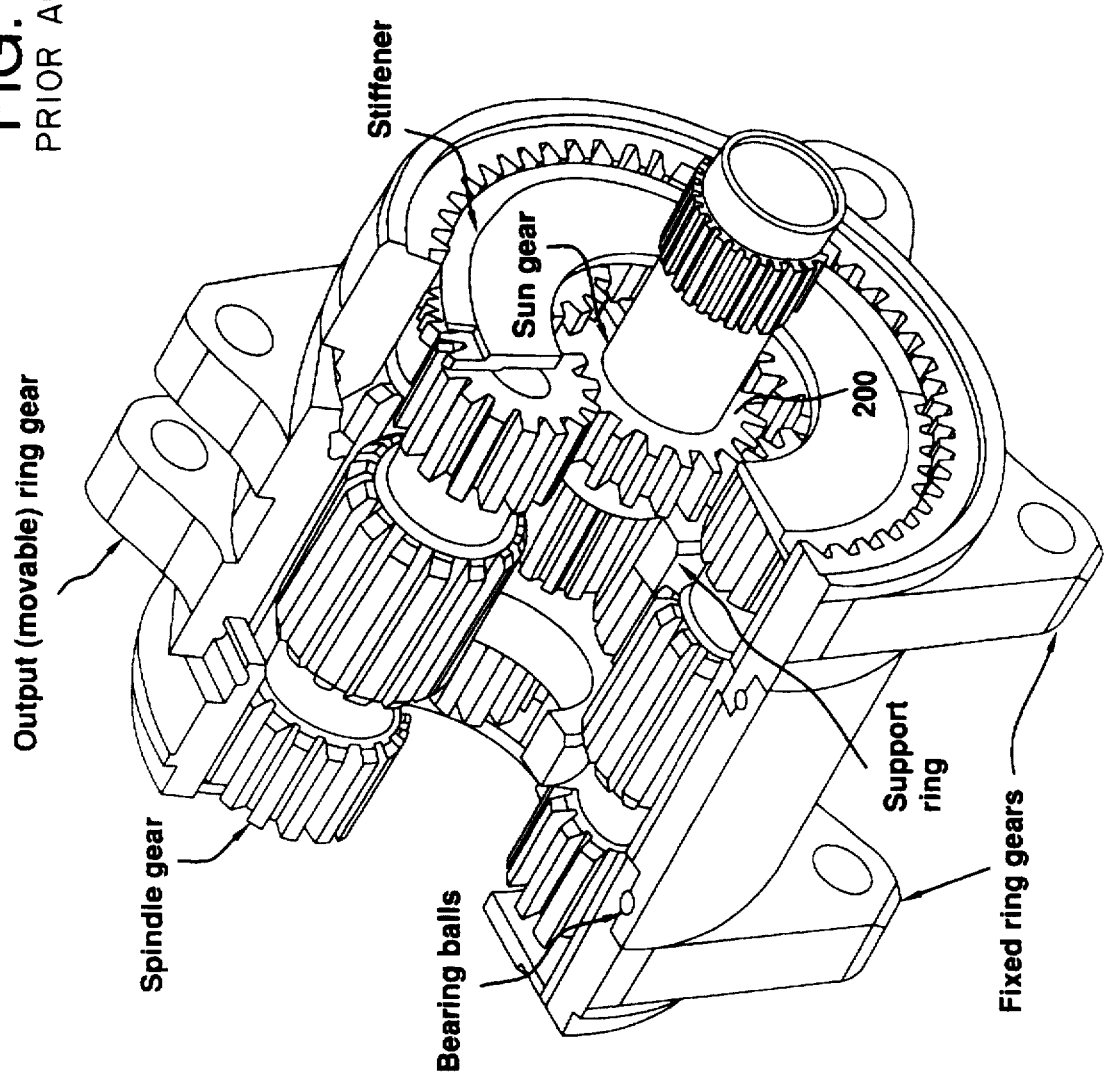
FIG. 1 is a perspective view of a prior art actuator comprising a single slice actuator.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

FIG. 1 shows a prior art actuator embodiment utilizing the concepts of the Curtiss-Wright Power Hinge® comprising a single slice actuator.

Figure 2B:
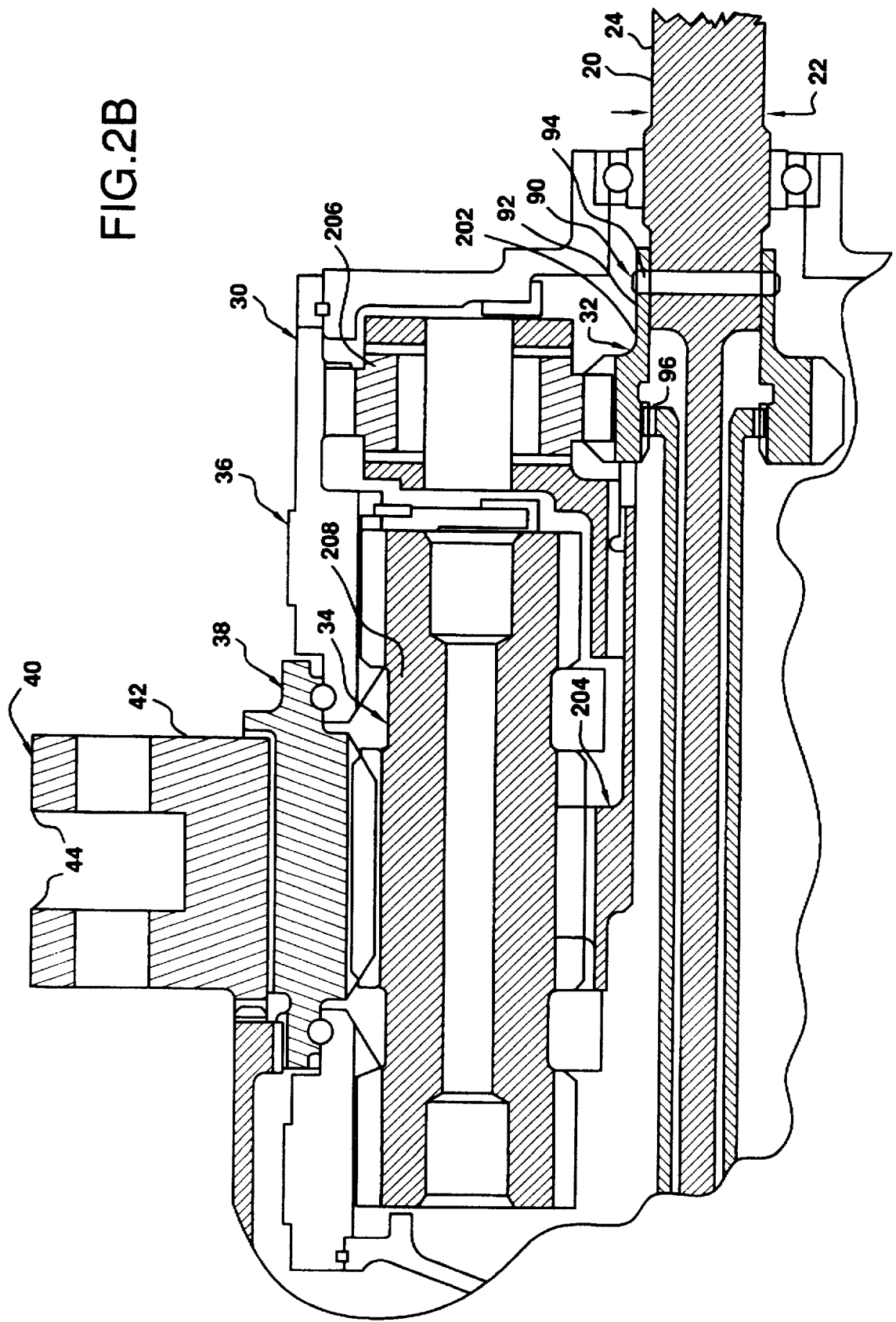
FIG. 2B is a portion of the cross-sectional view of FIG. 2A generally encompassed by line B—B and shown enlarged.
Figure 2C:
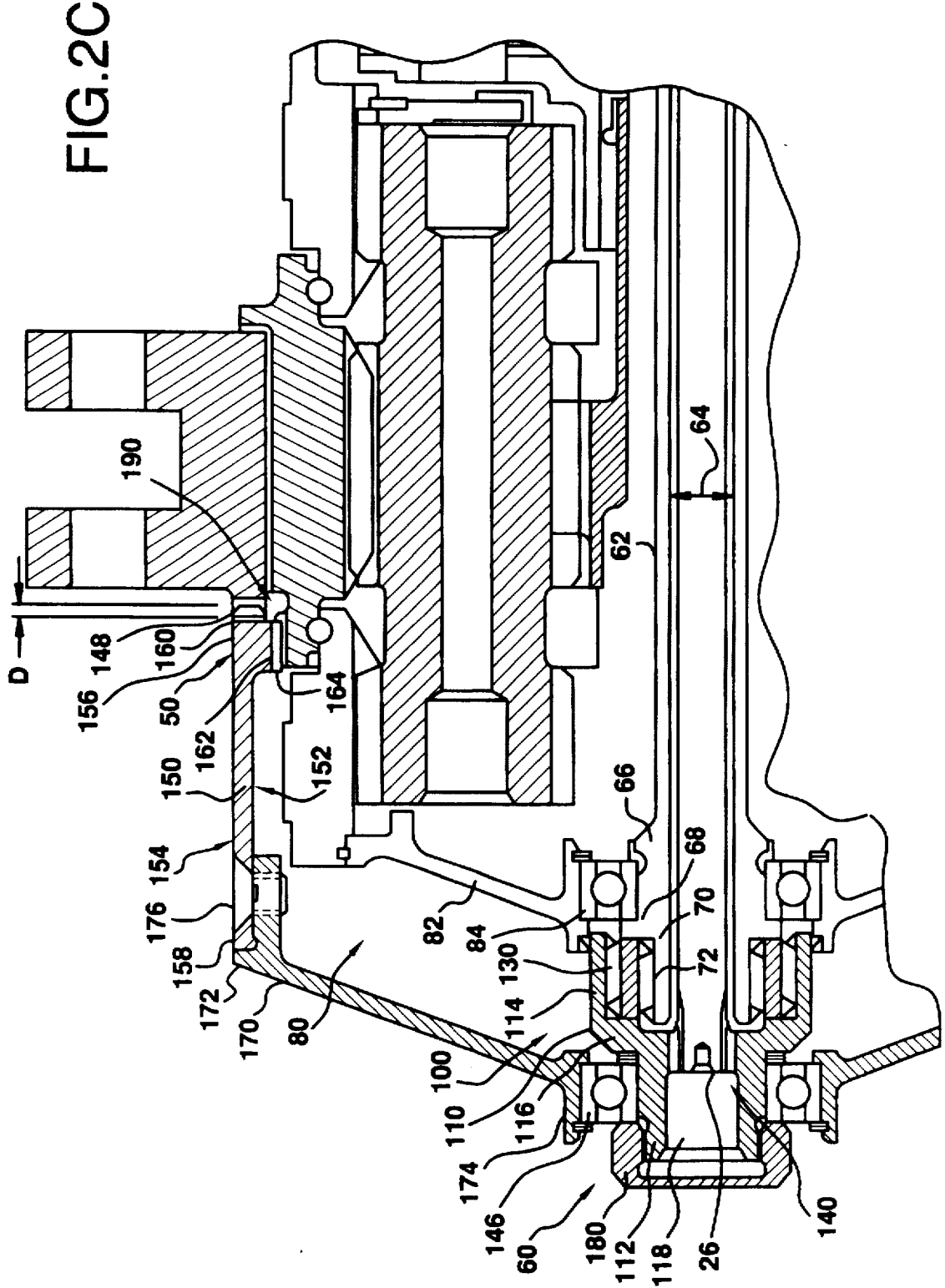
FIG. 2C is another portion of the cross-sectional view of FIG. 2A generally encompassed by line C—C and shown enlarged.

FIGS. 2A–2C illustrate, in a first embodiment, a jam-tolerant geared rotary actuator 10, according to the present invention, generally indicated by the reference numeral 10.

The parts shown cross-hatched rotate in normal operation. The actuator 10 is connected to an input source by an input shaft 20, which in turn drives a rotary gear means 30. The input shaft 20 has an outer diameter 22, a proximal end 24 near the input source, and a distal end 26. The rotary gear means 30 may include a sun gear means 32, a planet gear means 34, a fixed ring gear means 36, a movable ring gear means 38, and an output ring means 40. The output ring means 40 includes an output ring 42 and at least one output lug 44.

In a normal operating mode, the input shaft 20 drives the sun gear means 32 of the rotary gear means 30. The teeth of the planet gear means 34 engage the teeth of the fixed ring gear means 36 and the teeth of the movable ring gear means 38. The fixed ring gear means 36 is affixed to a base surface, such as an aircraft support structure by lugs 48. The output lug 44 is connected to an object or surface to be moved with respect to the base surface, or controlled surface, such as a wing flap. In the event of a jam, whether due to internal or external causes, gear movements within the actuator may be arrested although torque continues to be applied to the actuator 10 through the input shaft 20.

In the first embodiment, the actuator 10 is further comprised of an output spline means 50 for releasably connecting the movable ring gear means 38 to the output ring means 40, a decoupling means 60, an axial displacement means 100, and an input engagement means 140, as described below.

The decoupling means 60 preferably includes a hollow timing shaft 62, which has an inner diameter 64 that is larger than the outer diameter 22 of the input shaft 20, such that the input shaft 20 could freely rotate with the hollow timing shaft 62 whenever the two are not connected to each other. The input shaft 20 is inserted into and remains disposed within the center of the hollow timing shaft 62 after assembly. The timing shaft 62 has a support portion 66, an external shoulder portion 68, and a lip portion 70, the three portions being disposed at the distal end of the timing shaft 62 which surrounds the distal end of the input shaft 20. The lip portion 70 has an external left hand thread 72.

The actuator 10 further has a timing shaft support means 80 which includes a timing shaft support 82 for radially and axially supporting the timing shaft 62 and for allowing the timing shaft 62 to rotate freely. The timing shaft support 82 is shown fixedly attached to the fixed ring gear means and rotatably connected to the timing shaft by a timing shaft bearing 84.

Figure 3:
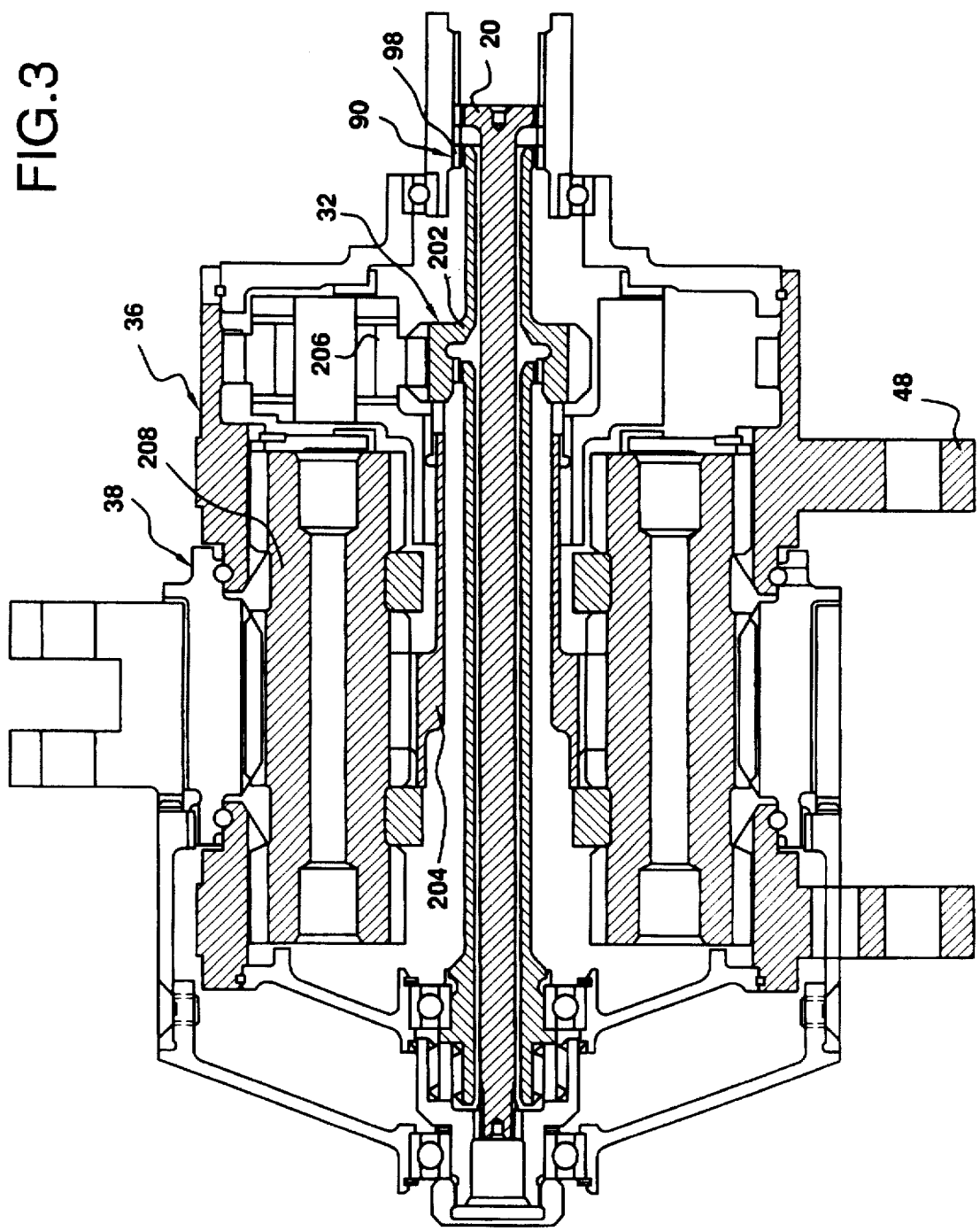
FIG. 3 is a cross-sectional view of a second embodiment of the present invention.

The decoupling means 60 further includes a shear means 90 for connecting the input shaft 20 to the sun gear means 32 at the shear portion 92 of the sun gear means 32. In the embodiment shown in FIGS. 2A–B, the shear means 90 is a shear pin 94 radially disposed between, and connecting, the input shaft 20 and the sun gear means 32, wherein the sun gear means 32 is otherwise connected to the timing shaft 62, preferably with a sun gear spline 96. It should be understood that the shear pin 94 could directly connect the input shaft 20 to the timing shaft 62. In another embodiment, a shear spline member 98 is shown in FIG. 3 as connecting the input shaft 20 to the sun gear means 32.

In the event of jam in the actuator 10, the shear means 90 will "sense" the jam by being sheared between the input shaft 20 and the sun gear means 32 whenever a predetermined, selectable torque is applied to the system. When the shear means 90 shears, a jam-tolerant mode of operation is initiated and the input shaft 20 and the timing shaft 62 are no longer constrained to rotate together because the sun gear means 32 which drives the timing shaft 62 is disconnected from the input shaft 20.

Referring again to FIGS. 2A–2C, the axial displacement means 100 is disposed near the distal end 26 of the input shaft 20 and timing shaft 62. The axial displacement means 100 includes a decoupling bushing 110 and a double threaded decoupling nut 130. The decoupling bushing 110 has an external support portion 112, a lip portion 114, an internal shoulder portion 116, and a central bore 118.

Figure 4:
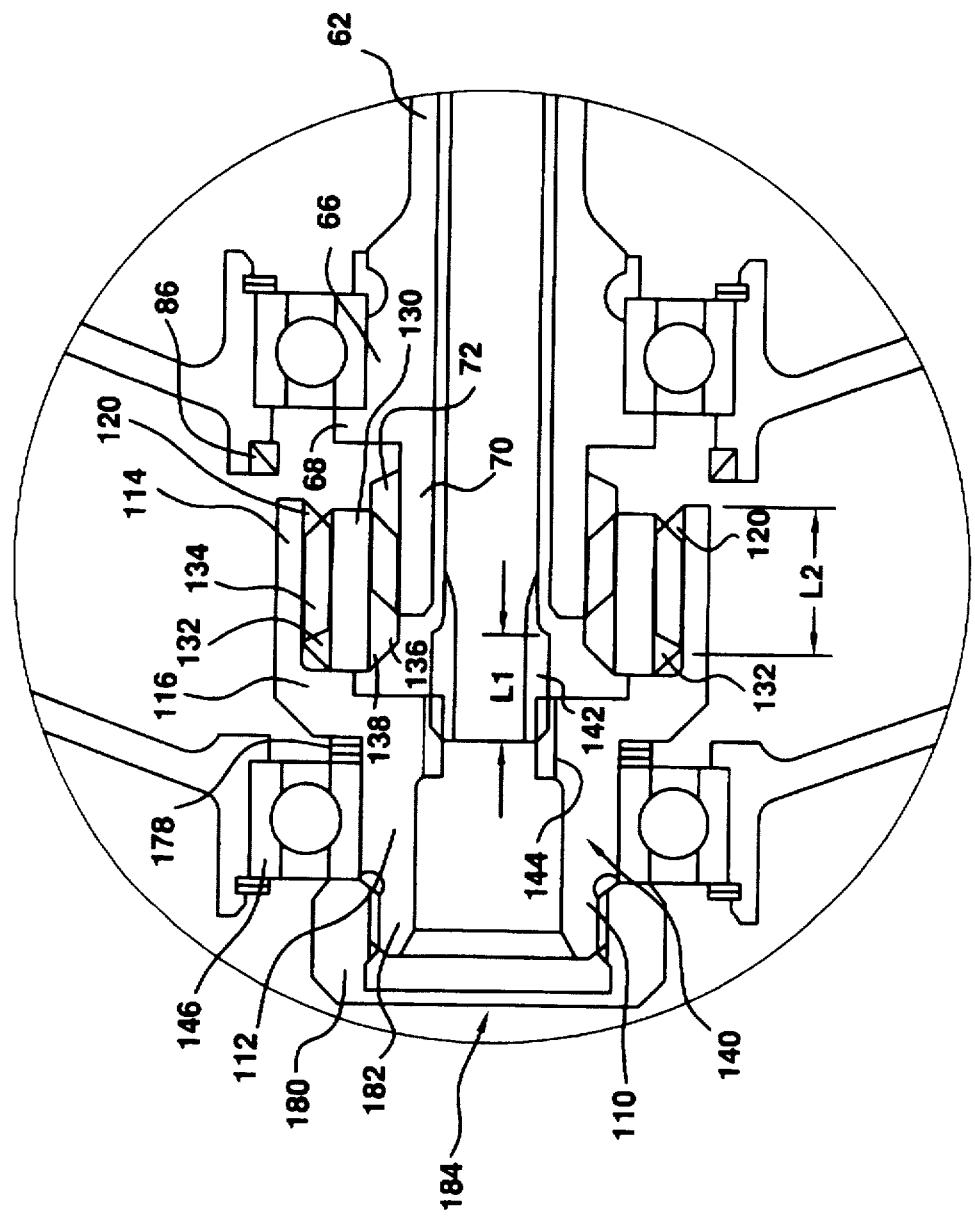
FIG. 4 is a close-up cross-sectional view of the nut arrangement shown in FIG. 2A and delineated by circle D—D.

As best seen in FIG. 4, the lip portion 114 of the decoupling bushing 110 is threaded to have an internal right-hand thread 120. The decoupling nut 130 is threaded such that the external walls 132 of the nut have an external right hand thread 134 which matches the internal right-hand thread 120 of the lip portion 114 of the decoupling bushing 110. The decoupling nut 130 is also threaded such that the internal walls 136 of the nut have an internal left hand thread 138 which matches the external left hand thread 72 of the lip portion 70 of the timing shaft 62. Thus, the nut 130 can be screwed onto the distal end of the timing shaft 62 in a counterclockwise direction relative to the timing shaft 62, when viewed from the distal end of the timing shaft 62, until the nut 130 rests against the external shoulder portion 68 of the timing shaft 62. Similarly, the decoupling bushing 110 may be screwed onto the nut 130 in a clockwise direction relative to the nut 130, when viewed from the distal end of the timing shaft 62, until the internal shoulder portion 116 of the decoupling bushing 110 rests against the nut 130. In the normal mode of operation, the nut 130 contacts both the external shoulder portion 68 of the timing shaft 62 and the internal shoulder portion 116 of the decoupling bushing 110.

The direction, or orientation, or "handedness" of the mating pairs of threads may, of course, be reversed, so that the external walls 132 of the decoupling nut 130 and the lip portion 114 of the decoupling bushing 110 may have mating left hand threads while the internal wall 136 of the decoupling nut 130 and the lip portion 70 of the timing shaft 62 have mating right hand threads.

Thus, the lip portion 70 of the timing shaft 62 has an external thread, the lip portion 114 of the decoupling bushing 110 has an internal thread of opposite hand to the lip portion 70 of the timing shaft 62, the external wall 132 of the decoupling nut 130 has an external thread corresponding to the internal thread of the lip portion 114 of the decoupling bushing 110, and the internal wall 136 of the decoupling nut has an internal thread corresponding to the external thread of the lip portion 70 of the timing shaft 62, whereby the respective corresponding threads mate with and releasably engage each other.

In the normal mode of operation, the axial displacement means 100 is releasably connected to the distal end 26 of the input shaft 20 by the input engagement means 140. As seen in the closeup in FIG. 4, the input engagement means 140 includes one or more axial input splines 142 disposed on the outer diameter 22 of the distal end 26 of the input shaft 20, as well as one or more axial input spline grooves 144 corresponding to the axial input splines 142 on the input shaft 20 and being disposed on the central bore 118 of the decoupling bushing 110.

A bushing bearing 146 is circumferentially disposed around the external support portion 112 of the decoupling bushing 110 and disposed between the decoupling bushing 110 and the output spline means 50.

Figure 5:
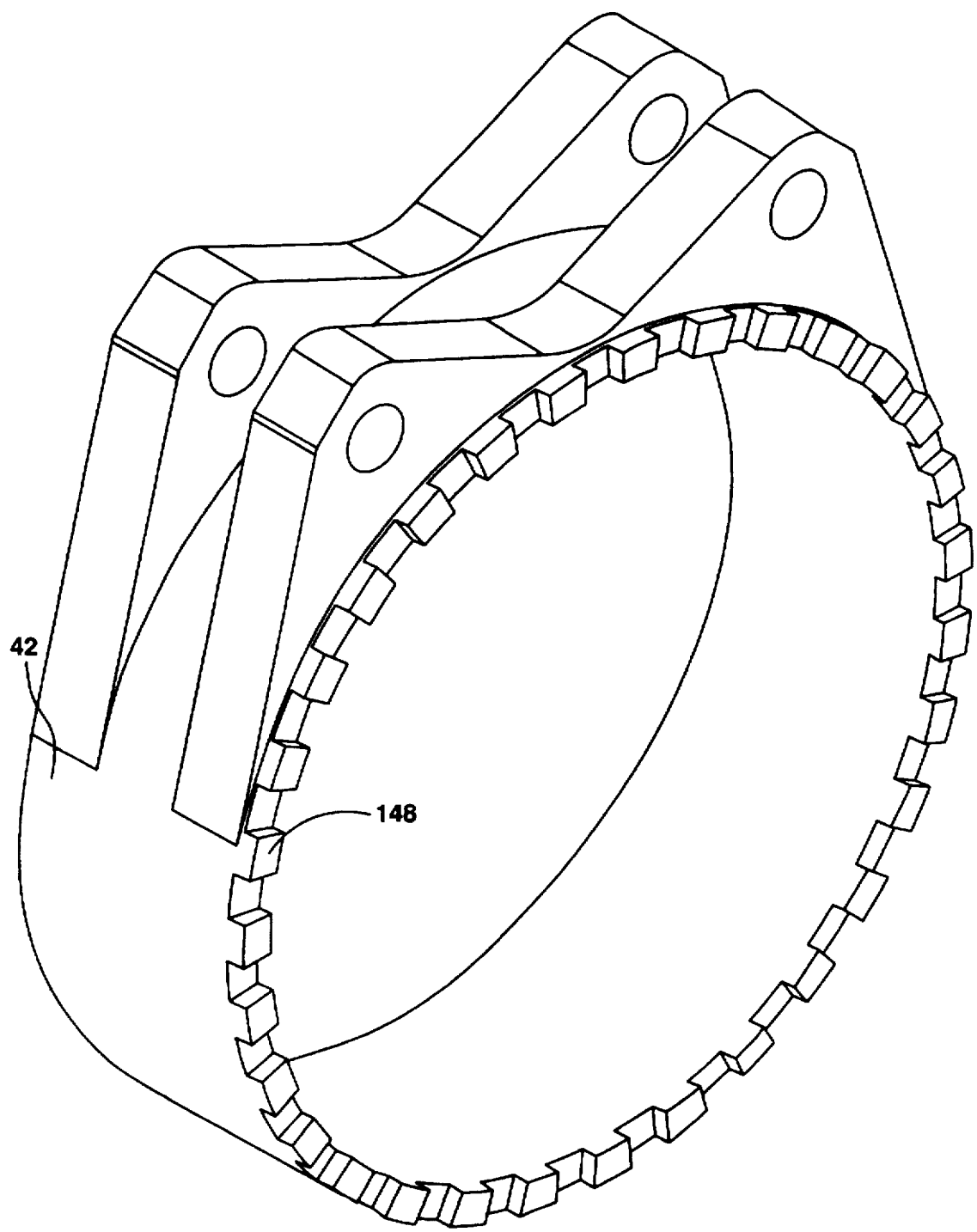
FIG. 5 is a perspective view of an output drive ring according to the present invention.

The output spline means 50 releasably connects the movable ring gear means 38 to the output ring means 40. As seen in FIG. 5, the output ring means 40 preferably includes a plurality of output spline teeth 148 circumferentially disposed around and extending axially outward from an edge of the output ring 42 and toward the output spline means 50. As see in FIG. 6, the output spline means 50 preferably includes a face spline member 150 having an inner diameter 152, an outer diameter 154, a proximal end 156, a distal end 158, and a plurality of circumferentially spaced mating axial spline teeth 160 compatible with the plurality of output spline teeth 148 of the output ring means 40. The teeth of the face spline member 150 are disposed on the proximal end 156 which is in proximity to the output ring 42. In the normal operating mode, the teeth of the face spline member 150 fully engage the teeth of the output ring 42.

Figure 6:
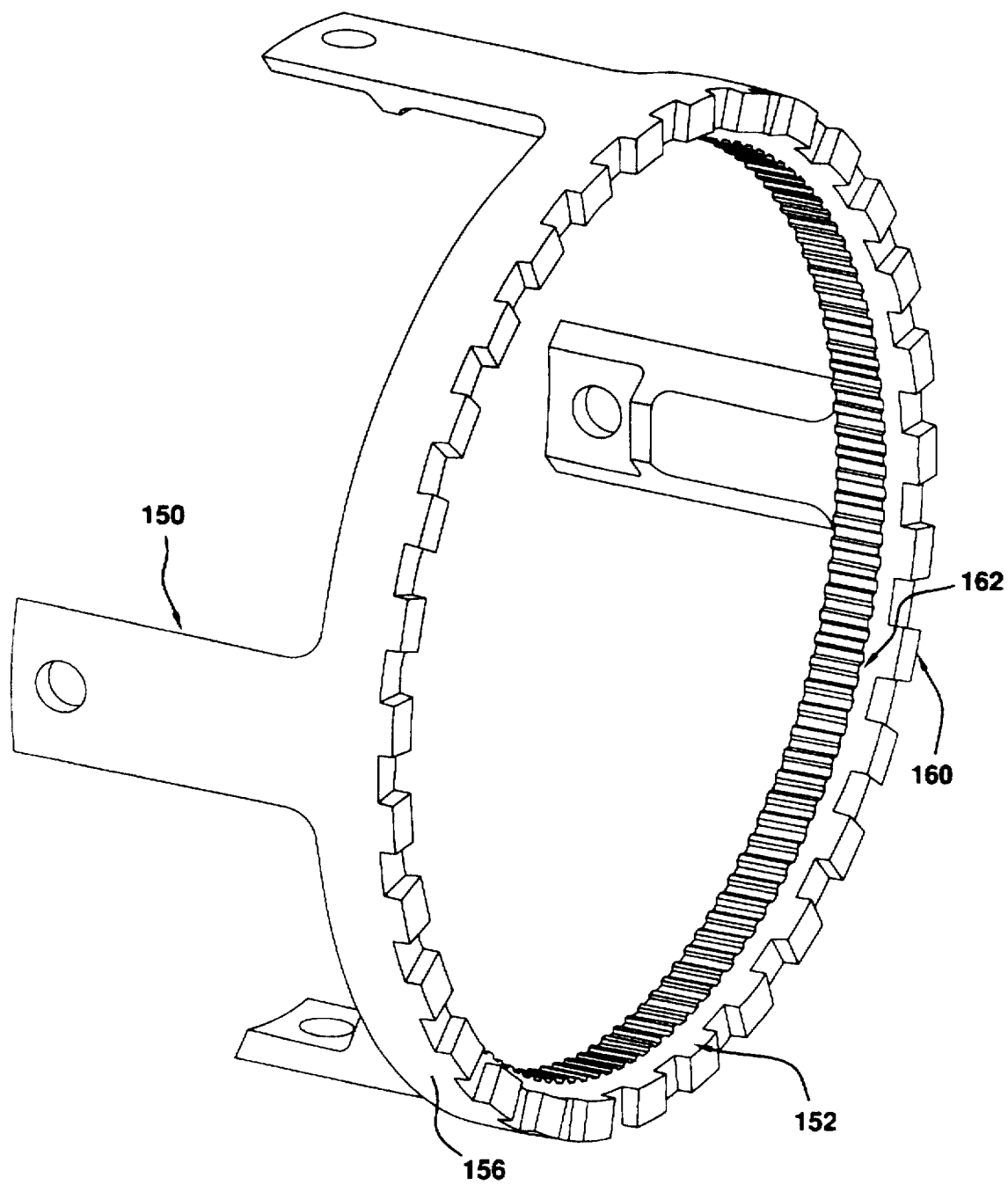
FIG. 6 is a perspective view of a face spline member according to the present invention.

The output spline means 50 shown in FIG. 6 further includes at least one axial output spline 162 disposed upon the inner diameter 152 of the proximal end 156 of the face spline member 150. Also, the movable ring gear means 38 further includes at least one axial output spline groove 164, corresponding to the axial output spline(s) 162 on the face spline member 150, such that the axial output spline(s) 162 slidingly engage the axial output spline groove(s) 164. In the normal operating mode, the axial output splines 162 on the face spline member 150 fully engage the grooves 164 on the movable ring gear means 38.

Therefore, the output spline means 50 releasably connects the movable ring gear means 38 to the output ring means 40 by the face spline member 150.

A face spline support member 170 supports the face spline member 150 between the output ring means 40 and the axial displacement means 100. The face spline support member 170 has a proximal end 172 and a distal end 174, as seen in FIG. 2, wherein the proximal end 172 has a larger diameter than the distal end 174. The face spline support member 170 may have the shape of a truncated hollow frustrum. The proximal end 172 is attached to the distal end 158 of the face spline member 150, shown in FIG. 2 as being attached by a plurality of screws 176. It should be understood that the face spline member 150 may be attached to the face spline support member 170 by other means, such as welding, pins, nut/bolt/washer arrangements, etc. Alternatively, the face spline member 150 and the face spline support member 170 may be fabricated from a single material as one contiguous element. The distal end 174 of the face spline support member 170 is disposed around the bushing bearing 146.

It should be noted that the external support portion 112 of the decoupling bushing 110 and the bushing bearing 146 should be preferably constructed and installed to provide a snug axial fit for the bearing 146, such that the bearing 146 experiences virtually no axial movement or "play". FIG. 4 illustrates a bushing bearing washer 178 used in conjunction with a bushing bearing cap 180. The cap 180 and the distal end 182 of the decoupling bushing 110 may be threaded, or the cap and the bushing may be connected by some other suitable means such as welding, gluing, press-fit, etc. The cap 180 may be constructed with a central bore 184 so that the input shaft 20 may extend through the cap. The input shaft 20 could thus be connected to another actuator system, a bearing, or some other apparatus. Therefore, the decoupling bushing 110, the bushing bearing 146, the bushing bearing cap 180, the face spline support member 170 and the face spline member 150 all move in unison whenever the decoupling bushing 110 is moved in the axial direction.

Figure 7:
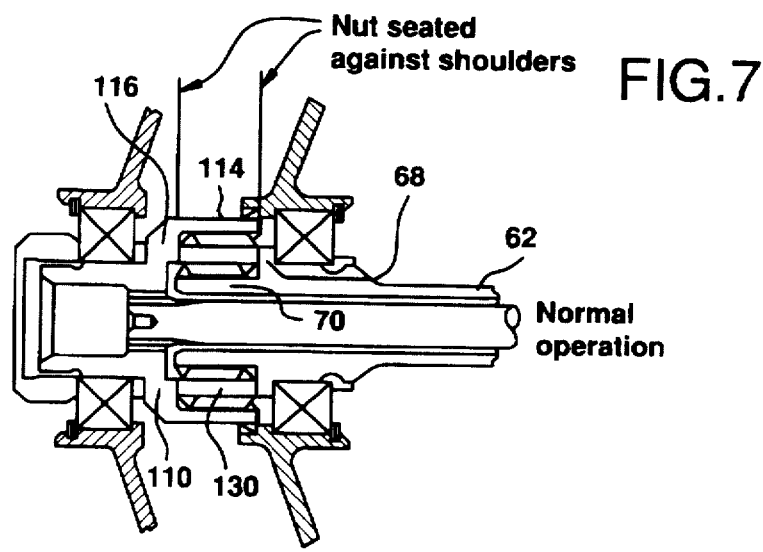
FIG. 7 is a partial cross sectional side view of the nut arrangement shown in FIG. 2A in the normal operating mode.

In the normal operating mode, the double threaded decoupling nut 130 abuts the internal shoulder portion 116 of the decoupling bushing 110 as well as the external shoulder portion of the timing shaft 62. The normal operating mode is illustrated in FIG. 7.

When a jam occurs, whether due to internal or external causes, the shear means 90 shears, and a jam-tolerant mode of operation is initiated. In the jam-tolerant mode, the input shaft 20 and the timing shaft 62 rotate relative to each other. The input shaft 20 continues to rotate in its original direction. The timing shaft 62 no longer rotates due to the jam that has developed.

Figure 8:
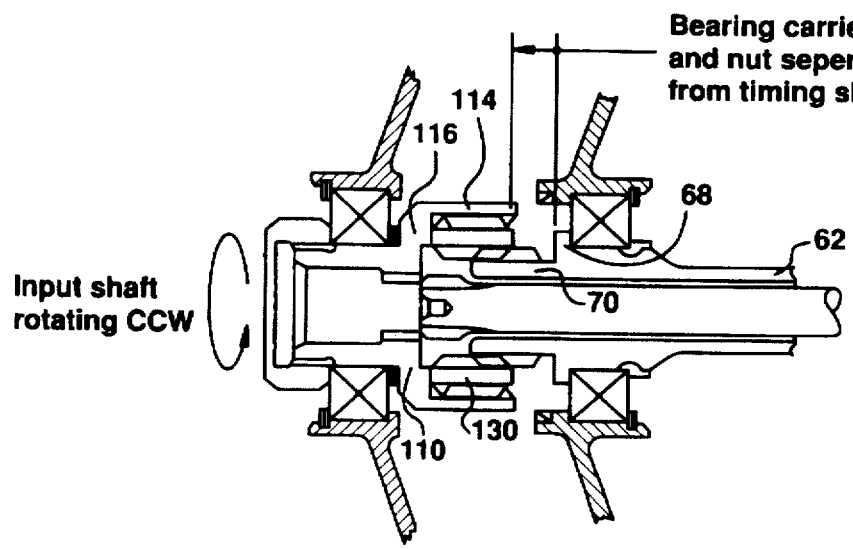
FIG. 8 is a partial cross sectional side view of the nut arrangement shown in FIG. 2A when the input shaft rotates clockwise in the jam-tolerant mode.

As seen in FIG. 8, rotation of the input shaft 20 clockwise relative to the timing shaft, when viewed from the distal end 26 of the input shaft 20 in the jam-tolerant mode, causes the nut 130 to abut the internal shoulder portion 116 of the decoupling bushing 110, and further causes the nut 130 to travel toward the distal end 26 of the input shaft 20 along the internal left hand thread 138 of the nut 130 and the external left hand thread 72 of the lip portion 70 of the timing shaft 62, thereby axially displacing the bushing 110 and the output spline means 50 to the extent that the output ring 42 disengages from the movable ring gear means 38.

Figure 9:
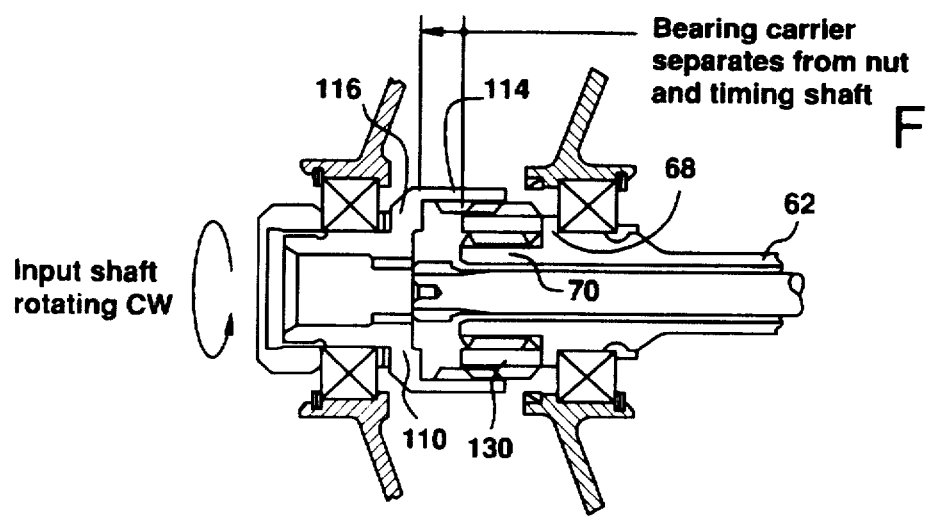
FIG. 9 is a partial cross sectional side view of the nut arrangement shown in FIG. 2A when the input shaft rotates counterclockwise in the jam-tolerant mode.

Conversely, as seen in FIG. 9, rotation of the input shaft 20 counterclockwise relative to the timing shaft 62, when viewed from the distal end 26 of the input shaft 20 in the jam-tolerant mode, causes the nut 130 to abut the external shoulder portion 68 of the timing shaft 62, and causes the decoupling bushing 100 to travel toward the distal end 26 of the input shaft 20 along the external right hand thread 134 of the nut 130 and the internal right hand thread 120 of the lip portion 114 of the decoupling bushing 110, thereby axially displacing the bushing 110 and the output spline means 50 to the extent that the output ring 42 disengages from the movable ring gear means 38.

In the event of either the clockwise or the counterclockwise input shaft 26 rotation in the jam-tolerant mode, continued axial displacement of the decoupling bushing 110 also disengages the decoupling bushing 110 from the input shaft 20 itself, as partially seen in FIG. 4. The one or more axial input splines 142 disposed on the outer diameter 22 of the distal end 26 of the input shaft 20 axially slide out of engagement with the corresponding one or more axial input spline grooves 144 disposed on the central bore 118 of the decoupling bushing 110. Disengaging the decoupling bushing 110 from the input shaft 20 helps to reduce any unwanted loads imparted to the input shaft. It should be noted that the one or more axial input splines 142 disposed on the input shaft 20 should preferably have an axial length "L1" longer than the depth "D" of the output spline teeth 148 on the face spline member 150 as marked in FIG. 2C, which would allow the output ring means 40 to become disconnected from the movable ring gear means 38 before the input shaft 20 becomes disconnected from the decoupling bushing 110. Similarly, threaded portions (72, 120) of the timing shaft 62 and the bushing 130 should be longer ("L2") than the depth "D" of the output spline teeth 148 to insure full disengagement of the output ring means 40 before reaching the end of the usable thread. The lip portions (70, 114) of the timing shaft 62 and the decoupling bushing 110 must be sized and threaded to achieve the goal of full disengagement of the output ring means 40.

The timing shaft support 82 also includes a flexible external timing shaft bearing seal 86, most clearly seen in FIG. 4. The seal 86 contacts the lip portion 114 of the decoupling bushing 110.

FIG. 2C shows a disengagement spring means 190 disposed between the proximal end 156 of the face spline member 150 and the movable ring gear means 38. The spring means 190 substantially prevents the face spline member 150 from re-engaging with the output ring 42 in the jam-tolerant mode. The spring means 190 may be a wave spring.

It should be noted that various rotary gear arrangements are possible without departing from the scope of this invention. For example, as seen in FIG. 1, the sun gear means 32 comprises a single sun gear 200 which directly drives the planet gear means 34 that are in direct contact with the fixed ring gear means 36 and the movable ring gear means 38. By way of another example, as illustrated in FIGS. 2A–2B and similarly in FIG. 3, the sun gear means 32 may consist of a first stage sun gear 202 and a compound stage sun gear 204, where the first stage sun gear 202 drives a first stage planetary gear means 206, and the compound stage sun gear 204 drives planet gears 208 which are in direct contact with the fixed ring gear means 36 and the movable ring gear means 38. The present invention contemplates incorporating the jam tolerant feature into these and other rotary actuator arrangements.

Figure 10:
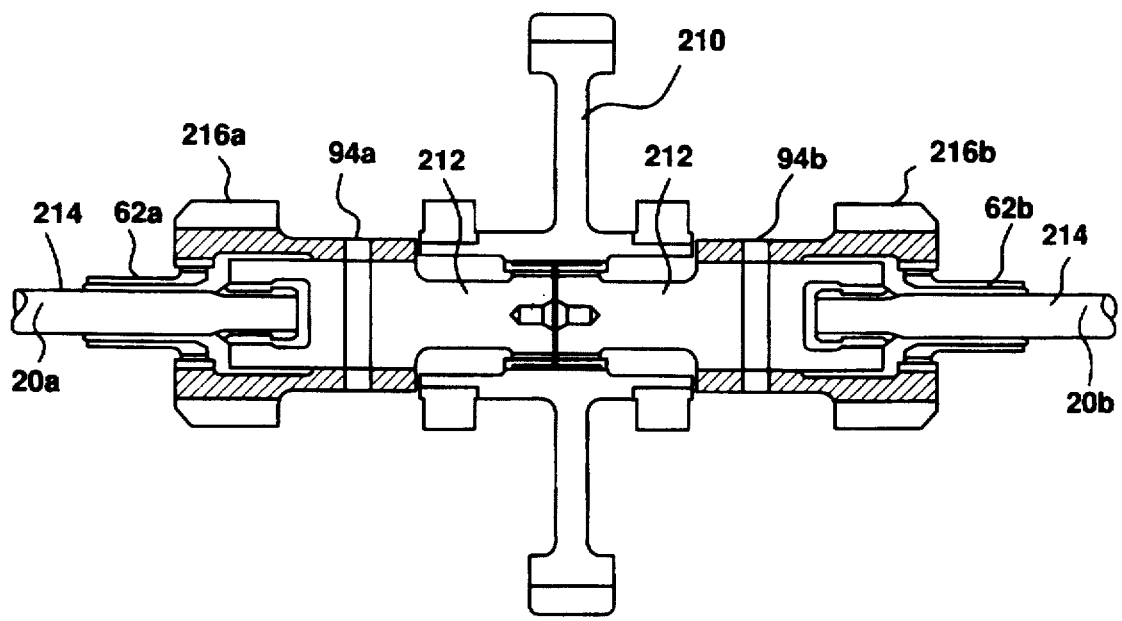
FIG. 10 is an alternate embodiment having two input shafts and two shear pins.

An alternative embodiment of an input means and shear means embodiment is shown in FIG. 10 which illustrates two input shafts 20a, 20b driven by a single input gear 210. Each input shaft 20a, 20b comprises a first input section 212 having multiple diameters, and a second input section 214 which has a smaller diameter than the first input section 212 to fit into a respective hollow timing shaft 62a, 62b. A shear pin 94a, 94b connects each first input section 212 to a sun gear 216a, 216b and the sun gear is connected to the respective timing shaft 62a, 62b. The first input section 212 is also connected to the second input section 214 by splines or gear teeth.

Figure 11:
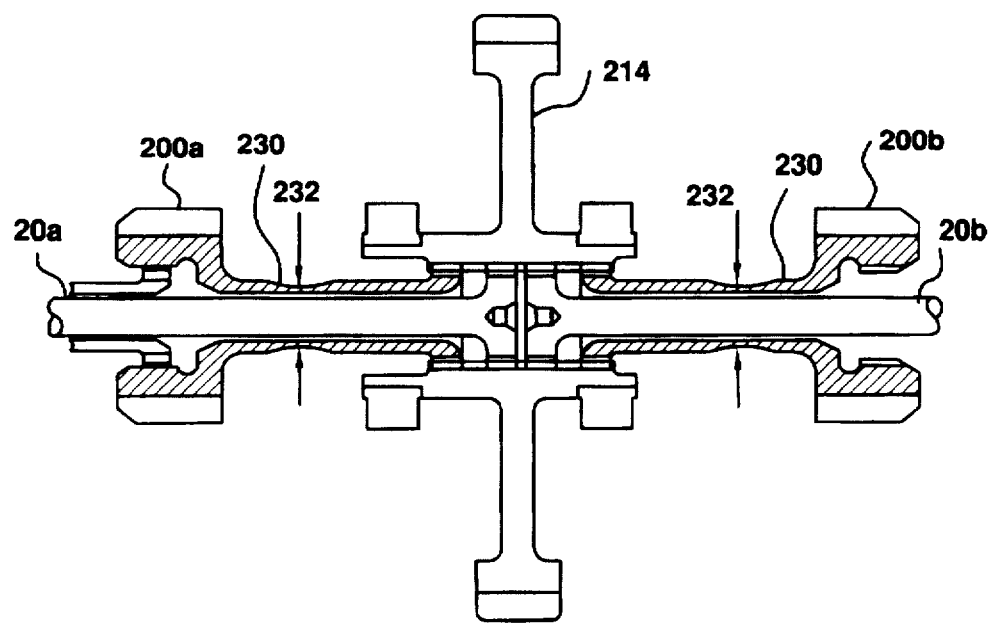
FIG. 11 is an alternate embodiment having two input shafts and two reduced wall thickness shear portions.

FIG. 11 shows yet another embodiment wherein an input gear 214 drives two input shafts 20a, 20b and two sun gears 200a, 200b. Each sun gear has a shear section 230 which has a reduced wall thickness 232. Upon "sensing" excessive torque in an actuator 10, the shear section 230 shears, disconnecting the sun gear (200a or 200b) from the respective input shaft (20a, 20b). The input shaft and the sheared-off section of the sun gear can thus continue to rotate.

It should be understood that the actuator 10 may also include a drive bearing which is circumferentially disposed between the movable ring gear means 38 and the output ring 42 for reducing resistance between the movable ring gear means and the output ring and for allowing the output ring 42 to move relative to the movable ring gear means 38 in the jam-tolerant mode. The actuator 10 may also include a static seal between the output ring 42 and the output spline means 50.

It should also be understood that the timing shaft bearing 84 and bushing bearing 146 may carry relatively high thrust loads to keep the decoupling bushing 110 engaged.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A jam-tolerant geared rotary actuator having a normal operating mode and a jam-tolerant operating mode, said rotary actuator comprising:

a. an input shaft having an outer diameter, a proximal end which is connected to an input source, and a distal end;

b. a rotary gear means including:
   a sun gear means having a shear portion;
   a planet gear means;
   a fixed ring gear means;
   a movable ring gear means;
   an output ring means;
c. an output spline means for releasably connecting said movable ring gear means to said output ring means;
d. a decoupling means including:
   a hollow timing shaft having an inner diameter greater than the outer diameter of said input shaft, wherein said input shaft is disposed within said timing shaft;
   a shear means connecting said input shaft to the shear portion of said sun gear means for sensing excessive torque in said actuator, wherein said shear means is capable of initiating the jam-tolerant mode;
e. a sun gear spline means for connecting said sun gear means to said hollow timing shaft;
f. an axial displacement means for engaging said output spline means with said movable ring gear means and said output ring means in the normal mode, and for disengaging said output spline means from said movable ring gear means and said output ring means in the jam-tolerant mode; and
g. an input engagement means for releasably connecting said axial displacement means to the distal end of said input shaft in the normal operating mode, and for disengaging said axial displacement means from the distal end of said input shaft in the jam-tolerant mode; wherein said input shaft and said hollow timing shaft rotate together in the normal operating mode; and wherein said input shaft and said hollow timing shaft shear said shear means in the jam-tolerant mode.

2. A jam-tolerant geared rotary actuator as defined in claim 1, wherein said actuator further comprises a timing shaft support means including a timing shaft support which is fixedly attached to said fixed ring gear means and rotatably connected to said timing shaft, for circumferentially supporting said timing shaft and for allowing said timing shaft to rotate freely.

3. A jam-tolerant geared rotary actuator as defined in claim 2, wherein said output spline means is rotatably connected to said axial displacement means.

4. A jam-tolerant geared rotary actuator as defined in claim 3 further comprising a spline support bearing disposed between said output spline means and said axial displacement means for allowing relative rotation between said output spline means and said axial displacement means.

5. A jam-tolerant geared rotary actuator as defined in claim 4, wherein the timing shaft of said decoupling means further comprises:
   a support portion;
   an external shoulder portion; and
   a lip portion having an external thread with a first pitch direction.

6. A jam-tolerant geared rotary actuator as defined in claim 5 further comprising a timing shaft bearing disposed circumferentially about the support portion of said timing shaft and disposed between said timing shaft and said timing shaft support.

7. A jam-tolerant geared rotary actuator as defined in claim 6, wherein said axial displacement means further comprises:
   a decoupling bushing having
      an external support portion,
      a lip portion having an internal thread of opposite hand to the external thread on the lip portion of the timing shaft,
      an internal shoulder portion, and
      a central bore.

8. A jam-tolerant geared rotary actuator as defined in claim 7, wherein said input engagement means further comprises:
   a. at least one axial spline disposed upon the outer diameter of the distal end of said input shaft; and
   b. at least one axial spline groove, corresponding to said at least one axial spline on said input shaft, and disposed on the central bore of said decoupling bushing;
   wherein said at least one axial spline engages said at least one axial spline groove in the normal operating mode, thereby enabling said input shaft to releasably connect to said decoupling bushing;
   wherein said at least one axial spline disengages from said at least one axial spline groove in the jam-tolerant mode, thereby enabling said input shaft to disconnect from said decoupling bushing.

9. A jam-tolerant geared rotary actuator as defined in claim 8, wherein said axial displacement means further comprises:
   a double threaded decoupling nut having an external thread and an internal thread of opposite hand;
   wherein the external thread of said nut is capable of mating with and releasably engaging the internal thread of the lip portion of said decoupling bushing;
   wherein said nut abuts the internal shoulder portion of said decoupling bushing in the normal operating mode;
   wherein the internal thread of said nut is capable of mating with and releasably engaging the external thread of the lip portion of said decoupling means;
   wherein said nut abuts the external shoulder portion of said decoupling means in the normal operating mode;
   wherein a rotation of said input shaft in a first direction relative to said timing shaft, in a jam-tolerant mode, causes said nut to abut the internal shoulder portion of said decoupling bushing, and causes said nut to travel toward the distal end of said input shaft along the internal thread of said nut and the external thread of the lip portion of said timing shaft, thereby axially displacing said bushing and said output spline means, whereby said output ring disengages from said movable ring gear means; and
   wherein a rotation of said input shaft in a second direction opposite to said first direction relative to said timing shaft, in a jam-tolerant mode, causes said nut to abut the external shoulder portion of said timing shaft, and causes said decoupling bushing to travel toward the distal end of said input shaft along the external right hand thread of said nut and the internal right hand thread of the lip portion of said decoupling bushing, thereby axially displacing said bushing and said output spline means, whereby said output ring disengages from said movable ring gear means.

10. A jam-tolerant geared rotary actuator as defined in claim 9 wherein said actuator further comprises a bushing bearing circumferentially disposed around the external support portion of said decoupling bushing and disposed between said decoupling bushing and said output spline means.

11. A jam-tolerant geared rotary actuator as defined in claim 10, wherein said output ring means further comprises a plurality of output spline teeth circumferentially disposed around and extending axially outward from an edge of said output ring and toward said output spline means.

12. A jam-tolerant geared rotary actuator as defined in claim 11, wherein said output spline means further comprises:

a face spline member having an inner diameter, an outer diameter, a proximal end, a distal end, and a plurality of circumferentially spaced mating axial spline teeth compatible with said plurality of spline teeth of said output ring means, said teeth disposed on the proximal end, wherein the proximal end is in proximity to the output ring.

13. A jam-tolerant geared rotary actuator as defined in claim 12, wherein said output spline means further comprises:

at least one axial output spline disposed upon the inner diameter of the proximal end of said face spline member; and wherein said movable ring gear means further comprises:

at least one axial output spline groove, corresponding to said at least one axial output spline on said face spline member;

wherein the at least one axial output spline slidingly engages the at least one axial output spline groove, whereby the spline fully engages the groove in the normal operating mode, thereby connecting said face spline member to said movable ring gear means in the normal operating mode.

14. A jam-tolerant geared rotary actuator as defined in claim 13, wherein said output spline means further comprises:

a face spline support member having a proximal end and a distal end, the proximal end having a larger diameter than the distal end, wherein the proximal end is attached to the distal end of said face spline member, and wherein the distal end is disposed around said bushing bearing.

15. A jam-tolerant geared rotary actuator as defined in claim 14 further comprising a disengagement spring means disposed between the proximal end of said face spline member and said movable ring gear means, whereby said spring substantially prevents said face spline member from re-engaging with said output ring in the jam-tolerant mode.

16. A jam-tolerant geared rotary actuator as defined in claim 15 wherein said disengagement spring means comprises a wave spring.

17. A jam-tolerant geared rotary actuator as defined in claim 14, wherein said shear means comprises a shear pin connecting said input shaft with the shear portion of said sun gear means.

18. A jam-tolerant geared rotary actuator as defined in claim 14, wherein said shear means comprises a shear spline member connecting said input shaft with the shear portion of said sun gear means.

19. A jam-tolerant geared rotary actuator as defined in claim 14, wherein said shear means comprises a section of the shear portion of said sun gear means having a reduced wall thickness.

20. A jam-tolerant geared rotary actuator as defined in claim 14, wherein said shear means comprises:

a. a shear pin connecting said input shaft with said sun gear means; and b. a sun gear spline means for connecting said sun gear means to said timing shaft.

21. A jam-tolerant geared rotary actuator as defined in claim 17 further comprising a sun gear spline for connecting said sun gear means to said input shaft.

22. A jam-tolerant geared rotary actuator as defined in claim 21 further comprising:

a. an input shaft bearing for rotatably supporting said input shaft;

b. at least one support ring disposed between said sun gear means and said planetary gear means for maintaining contact between said planetary gear means, said fixed ring gear means and said movable ring gear means.

23. A jam-tolerant geared rotary actuator as defined in claim 22 wherein said sun gear means further comprises a compound stage gear means.

24. The combination of first and second jam-tolerant geared rotary actuators according to claim 1 and a common input means connected to said first and second actuators for driving the respective input shafts of said actuators.

* * * * *

UNITED STATES PATENT AND TRADEMARK OFFICE
CERTIFICATE OF CORRECTION

PATENT NO.   :   5,779,587
DATED        :   July 14, 1998
INVENTOR(S)  :   William Reilly It is certified that error appears in the above-indentified patent and that said Letters Patent is hereby corrected as shown below:

On the title page, item ]54] and column 1, line 2, change "PINS" to --MEANS--

Signed and Sealed this

Twenty-fourth Day of November, 1998

Attest:

BRUCE LEHMAN

Attesting Officer

Commissioner of Patents and Trademarks